(12) United States Patent
Van Der Sluis et al.

(10) Patent No.: US 9,133,908 B2
(45) Date of Patent: Sep. 15, 2015

(54) PUSH BELT FOR A CONTINUOUSLY VARIABLE TRANSMISSION, COMPRISING DIFFERENT TYPES OF TRANSVERSE ELEMENTS

(75) Inventors: Francis Maria Antonius Van Der Sluis, Sint-Michielsgestel (NL); Irinel Cosmin Faraon, Berkel-Enschot (NL)

(73) Assignee: BOSCH TRANSMISSION TECHNOLOGY B.V., Tilburg (NL)

( * ) Notice: Subject to any disclaimer, the term of this patent is extended or adjusted under 35 U.S.C. 154(b) by 601 days.

(21) Appl. No.: 13/505,989

(22) PCT Filed: Oct. 27, 2010

(86) PCT No.: PCT/NL2010/000155
§ 371 (c)(1),
(2), (4) Date: Jul. 13, 2012

(87) PCT Pub. No.: WO2011/062480
PCT Pub. Date: May 26, 2011

(65) Prior Publication Data
US 2012/0277048 A1    Nov. 1, 2012

(30) Foreign Application Priority Data
Nov. 19, 2009 (NL) ..................... 1037483

(51) Int. Cl.
*F16G 5/16* (2006.01)
(52) U.S. Cl.
CPC ..................... *F16G 5/16* (2013.01)
(58) Field of Classification Search
CPC ............. F16G 5/16; F16G 5/18; F16G 5/20
USPC ........................................... 474/242
See application file for complete search history.

(56) References Cited

U.S. PATENT DOCUMENTS

| | | | | |
|---|---|---|---|---|
| 4,516,963 A | * | 5/1985 | Mott | 474/245 |
| 4,871,344 A | * | 10/1989 | Morisawa | 474/206 |
| 5,011,461 A | * | 4/1991 | Brouwers | 474/188 |
| 6,045,474 A | * | 4/2000 | Smeets et al. | 474/249 |
| 6,102,823 A | * | 8/2000 | Hosokawa et al. | 474/242 |

(Continued)

FOREIGN PATENT DOCUMENTS

| | | | |
|---|---|---|---|
| EP | 0994275 | * | 10/1998 |
| JP | 2006144978 A | * | 6/2006 |

(Continued)

*Primary Examiner* — Michael Mansen
*Assistant Examiner* — Michael Riegelman
(74) *Attorney, Agent, or Firm* — Troutman Sanders LLP; Ryan A. Schneider; Benjamin C. Wiles

(57) ABSTRACT

A push belt (6) for a continuously variable transmission comprises transverse elements (10) of at least two different types, wherein the differences between the transverse elements (10) reside in a profile (24) which is present at pulley sheave contact surfaces (18) of the transverse elements (10). On the basis of the use of at least two different types of transverse elements (10) as mentioned, many advantages are achieved, including improved traction, reduction of wear, and noise reduction. The design of the profile (24) can be such that a pattern of voids (28) is created at a contact side of the push belt (6), which voids (28) are used for receiving oil. The pattern of voids (28) can be random, or not. In the latter case, it is possible to have a path (28) for discharging oil, extending along the contact side of the push belt (6).

19 Claims, 4 Drawing Sheets

(56) References Cited

U.S. PATENT DOCUMENTS

| | | | |
|---|---|---|---|
| 6,893,370 B2 * | 5/2005 | Kobayashi | 474/242 |
| 7,261,656 B2 * | 8/2007 | Sakai | 474/242 |
| 7,892,126 B2 * | 2/2011 | van Lith et al. | 474/242 |
| 8,025,600 B2 * | 9/2011 | Tani et al. | 474/249 |
| 8,104,159 B2 * | 1/2012 | Hattori et al. | 29/407.05 |
| 8,814,735 B2 * | 8/2014 | Toyohara et al. | 474/242 |
| 2014/0221141 A1 * | 8/2014 | Van Der Sluis et al. | 474/242 |

FOREIGN PATENT DOCUMENTS

| | | | |
|---|---|---|---|
| JP | 2007303520 A | * | 11/2007 |
| JP | 2009185945 A | * | 8/2009 |
| JP | 2011089588 A | * | 5/2011 |

* cited by examiner

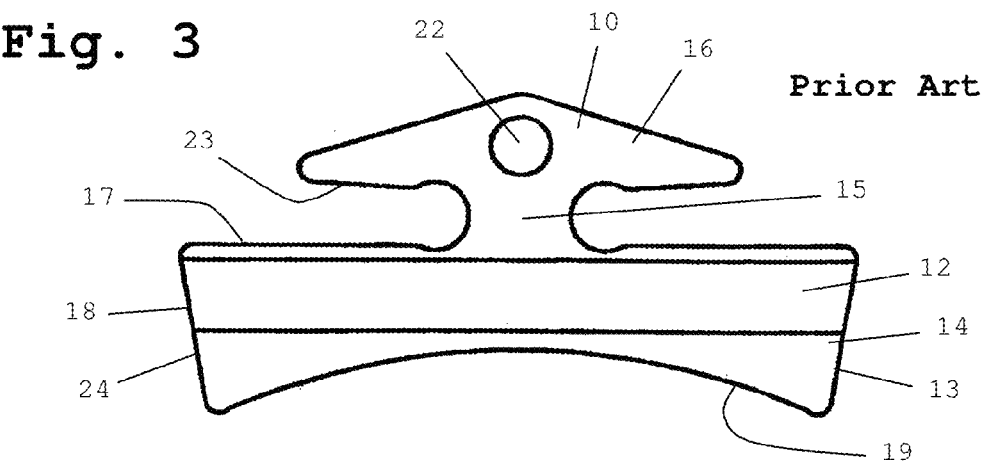
Fig. 3  Prior Art
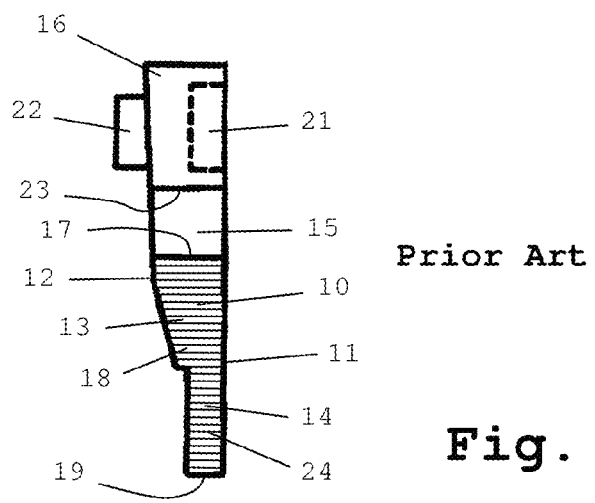
Prior Art  Fig. 4
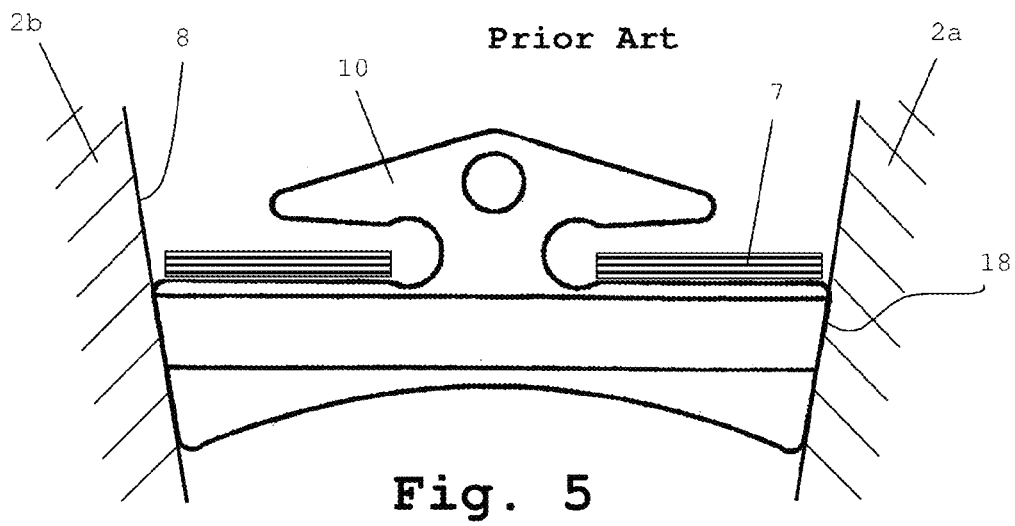
Prior Art  Fig. 5

PUSH BELT FOR A CONTINUOUSLY VARIABLE TRANSMISSION, COMPRISING DIFFERENT TYPES OF TRANSVERSE ELEMENTS

CROSS-REFERENCE TO RELATED APPLICATIONS

This application is a US National Stage of International Application No. PCT/NL2010/000155, filed 27 Oct. 2010, which claims the benefit of NL 1037483, filed 19 Nov. 2009, each herein fully incorporated by reference.

FIELD OF THE INVENTION

The present invention relates to a push belt for a continuously variable transmission, which is particularly destined to be arranged around pulleys of the continuously variable transmission, and which comprises a number of transverse elements and ring-shaped carriers for carrying the transverse elements, wherein the transverse elements have carrying surfaces for supporting the carriers, and contact surfaces for engaging contact surfaces of pulley sheaves which are part of the pulleys of the continuously variable transmission, wherein the contact surfaces of the transverse elements are provided with a profile, wherein there are at least two types of transverse elements present in the push belt, wherein the profile on the contact surfaces of transverse elements of one type is different than the profile on the contact surfaces of transverse elements of another type, and wherein the profiles on the contact surfaces of the transverse elements comprise a pattern of alternating elevations and recesses.

Furthermore, the present invention relates to a continuously variable transmission comprising a push belt.

BACKGROUND OF THE INVENTION

A push belt for a continuously variable transmission is generally known. Usually, such a push belt comprises two ring-shaped carriers for carrying a relatively large number of transverse elements. The carriers are like ribbons which are relatively thin in relation to their diameter. The transverse elements are arranged along the entire circumference of the carriers, wherein they are able to transmit forces which are related to a movement of the push belt.

For the purpose of receiving the carriers of the push belt, the transverse element is provided with recesses, at two sides, and for the purpose of supporting the carriers, the transverse element comprises carrying surfaces. Furthermore, for the purpose of contact between the transverse element and pulley sheaves of a pulley of a continuously variable transmission, the transverse element is provided with contact surfaces, at two sides, which are divergent with respect to each other in the direction of the carrying surfaces. The terms "top" and "bottom", which are hereinafter applied, are related to the direction of divergence; this is defined as being from bottom to top.

From bottom to top, the transverse element comprises successively a basic portion, a middle portion and a top portion, wherein the dimensions of the middle portion are relatively small. The basic portion comprises the carrying surfaces and the contact surfaces. Normally, in the push belt, the basic portion is located at the side of the inner circumference of the push belt, whereas the top portion is located at the side of the outer circumference of the push belt.

The transverse element has two main body surfaces which extend substantially parallel with respect to each other. A correct position of a transverse element in a push belt is a position in which the main body surfaces are more or less perpendicular to the circumferential direction of the push belt. At least a portion of a first main body surface of the transverse element is destined to abut against at least a portion of a second main body surface of an adjacent transverse element in the push belt, whereas at least a portion of the second main body surface of the transverse element is destined to abut against at least a portion of the first main body surface of another adjacent transverse element in the push belt.

A circumferential surface, of which the carrying surfaces and the contact surfaces are part, extends between the two main body surfaces. Furthermore, the top portion comprises two retaining surfaces which are facing the carrying surfaces, and which are also part of the circumferential surface. In a push belt, the position of the carriers is delimited in a radial direction of the push belt by the carrying surfaces at one side, and by the retaining surfaces at another side.

On one of the main body surfaces of the transverse element, a projection is arranged, whereas in another of the main body surfaces of the transverse element, a recessed portion, which will hereinafter be referred to as depression, is arranged. The positions of the projection and the depression correspond to each other, wherein the projection and the depression are usually positioned on the top portion. In the push belt, the projection of every transverse element is at least partially located in the depression of an adjacent transverse element, so that a mutual displacement of the transverse elements in a plane perpendicular to the circumferential direction of the push belt is prevented.

In order to guarantee proper functioning of the push belt having the carriers and the transverse elements as described in the foregoing, and to realize optimal torque transmittal in a continuously variable transmission in which the push belt may be applied, there is a need for effective contact between the transverse elements of the push belt and the pulleys of the continuously variable transmission. In view of this need, the contact surfaces of the transverse elements are often provided with a corrugated or serrated profile. The profile may be such that there is a pattern of alternating elevations and recesses, particularly ribs and grooves, which are both extending from one side of the contact surfaces to another, in the circumferential direction of the push belt, in a substantially parallel arrangement.

Among other things, when the contact surfaces are provided with a profile, indeed, the profile serves for preventing the formation of an oil film between the contact surfaces of the transverse element and the pulley sheaves, as a result of which slipping of the push belt with respect to the pulleys is prevented. Another advantageous effect of the application of a profile on the contact surfaces of the transverse element is that small mutual differences in the dimensions of the transverse elements of a push belt may diminish during a process of running-in of push belt and pulleys, because the profile allows for a situation in which a small wear of the contact surfaces takes place at places where the differences are the largest. In other words, pulleys and push belt may show a slight initial wear with respect to each other, after which a good grip between the contact surfaces of the transverse elements of the push belt and the pulley sheaves results, and the push belt is guided along the pulleys in an exceedingly stable fashion.

In fact, when the profile on the contact surfaces of the transverse element comprises a pattern of alternating ribs and grooves, tops of ribs initially have a relatively small surface, and therefore may relatively easily wear away a little in case of contact to a pulley sheave, as a result of which dimensional variations between the various transverse elements in the push belt are leveled out. In EP 0 994 275, a number of profiles which are arranged at the contact surfaces of transverse elements are described, wherein a sine-shaped profile is presented as a preferred embodiment.

As the contact between a pulley sheave and transverse elements mainly takes place at the positions of the ribs of the profile, it is true that not the entire contact surface of the pulley sheave is involved in torque transmittal. It is an objective of the present invention to provide a solution according to which the contact surface of the pulley sheaves is used to a much larger extent, so that torque transmittal can be further optimized and wear can be reduced.

BRIEF SUMMARY OF THE INVENTION

According to a first aspect of the present invention, the objective as mentioned is achieved by a push belt in which, in respect of at least a part of the total number of transverse elements, the patterns of elevations and recesses of adjacent transverse elements of a different type are shifted with respect to each other, in a radial direction in the push belt. According to a second aspect of the present invention, the objective as mentioned is achieved by a push belt comprising transverse elements in which, in the pattern of elevations and recesses of the profiles on the contact surfaces of the transverse elements, at least one elevation is removed with respect to a regular pattern of elevations and recesses, wherein a positioning of the missing elevation on the contact surfaces of the transverse elements is different for different types of transverse elements.

According to the present invention, transverse elements of various types are applied in a push belt for a continuously variable transmission, wherein the number of different types is at least two. The types of transverse elements differ as far as the design of the profiles on the contact surfaces is concerned, which comprise a pattern of alternating elevations and recesses. It is noted that having two different types of transverse elements in a push belt is known per se from EP 0 994 275. However, EP 0 994 275 does not disclose a shifted positioning of patterns of elevations and recesses of adjacent transverse elements. Also, EP 0 994 275 does not disclose the possibility of having at least one void in the regular pattern of elevations and recesses.

In general, when a push belt is applied in a continuously variable transmission, contact surfaces of sheaves of pulleys of the continuously variable transmission are continually engaged by the contact surfaces of the transverse elements. When the present invention is applied, it is very well possible to actually realize a situation in which the part of the contact surfaces of the pulley sheaves that is effectively used is larger than in a conventional situation. All it takes is to have different profiles on the contact surfaces of the transverse elements which are different in the sense of being complementary, i.e. which are different in such a way that when the profile of one type is a conventional profile which is designed such as to contact certain areas of the contact surfaces of the pulley sheaves, the profile of another type is designed such as to contact at least one other area of those contact surfaces.

Within the scope of the present invention, it is possible to have a push belt in which all transverse elements are provided with the same pattern of elevations and recesses, wherein the pattern is shifted in a radial direction of the push belt when the transverse elements of one type are compared to transverse elements of another type. In this way, when two types of transverse elements are present in the push belt, for example, it is achieved that a first series of areas on a contact surface of a pulley sheave is covered by a first type of transverse element, and that a different, second series of areas on the contact surface of the pulley sheave is covered by a second type of transverse element.

It is also possible that the push belt comprises transverse elements in which at least one elevation is omitted in the pattern of elevations and recesses of the profiles on the contact surfaces, when a comparison is made with a regular pattern of alternating elevations and recesses. Having the specific pattern as mentioned contributes to the prevention of the formation of an oil film between contact surfaces of the transverse elements and pulley sheaves, as there are voids for receiving oil at the positions where elevations are absent.

Advantageously, the position of the missing elevation on the contact surfaces of the transverse elements is different for different types of transverse elements. The transverse elements may be randomly arranged, but it is also possible to create a specific path for the oil by selecting the transverse elements and arranging the transverse elements in the push belt in such a way that every void connects to voids of adjacent transverse elements. In such a case, multiple paths may be created in the push belt for transporting oil to locations where the oil is allowed to accumulate. In general, if a specific arrangement of the transverse elements is chosen, this arrangement may be such that in respect of at least a part of the total number of transverse elements, the positioning of the missing elevation on the contact surfaces changes in a regular manner from one transverse element to an adjacent element. Hence, this arrangement may be such that each pair of adjacent transverse elements has the same mutual change of position for the missing elevation.

The number of missing elevations may be one or two in practical cases, but, within the scope of the present invention, other numbers are possible as well.

All in all, having different profiles on the contact surfaces of the transverse element in a single push belt offers various advantages, including an improved friction between the push belt and the pulleys of a continuously variable transmission in which the push belt may be applied, so that traction is improved. Other advantages are noise reduction by less monotonic behaviour, improved oil distribution between the push belt and the pulleys, and shortened time for oil removal when a contact surface of a transverse element engages a contact surface of a pulley sheave.

BRIEF DESCRIPTION OF THE DRAWINGS

The present invention will be explained on the basis of the following description of the invention with reference to the drawing, in which equal reference signs indicate equal or similar components, and in which:

FIGS. 3 and 4 diagrammatically show views of a transverse element which is part of the push belt;

FIG. 5 illustrates how the transverse element is positioned between sheaves of a pulley when the element is present in a portion of the push belt that is running on a pulley;

DETAILED DESCRIPTION OF PREFERRED EMBODIMENTS

Figure 1:
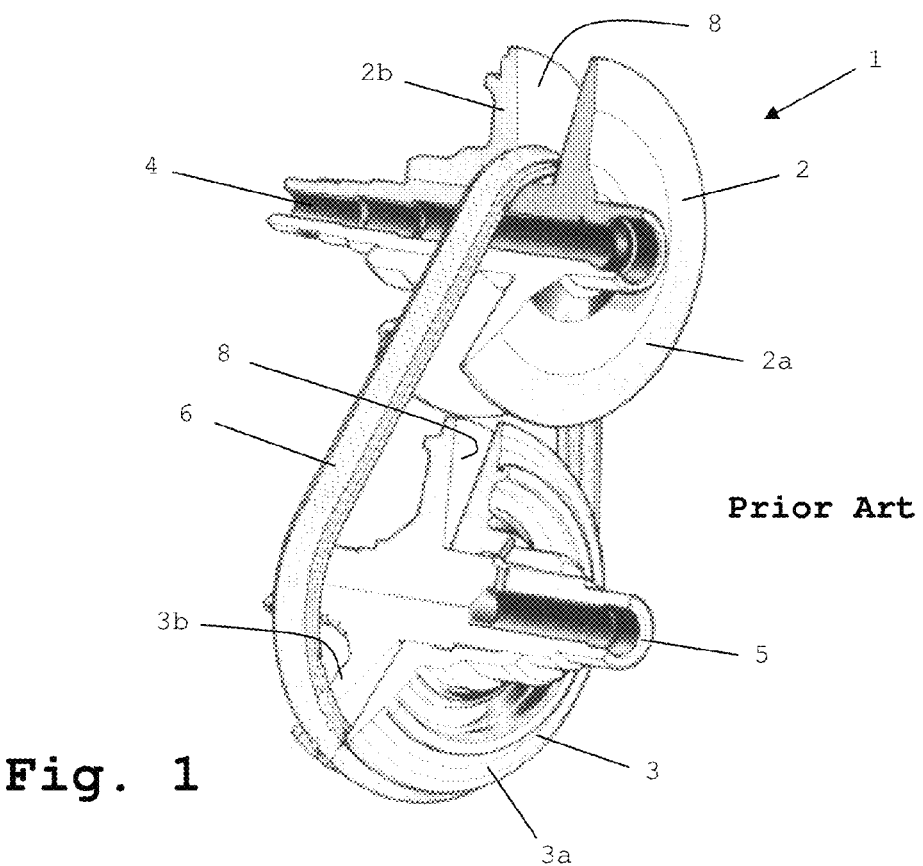
FIG. 1 diagrammatically shows a perspective view of a continuously variable transmission including a push belt.
Figure 2:
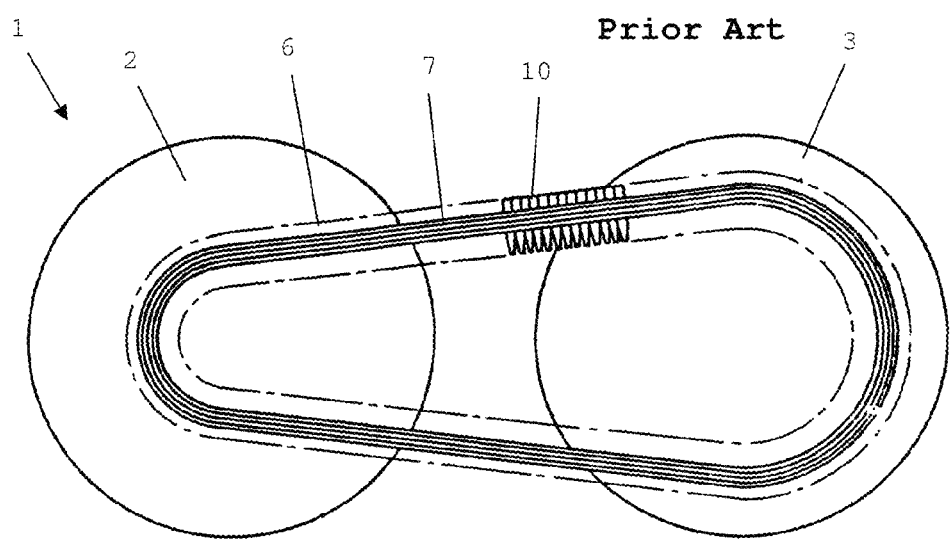
FIG. 2 illustrates how the push belt is arranged on pulleys in the continuously variable transmission.

FIGS. 1 and 2 show a continuously variable transmission, such as for utilization in a motor vehicle. The continuously variable transmission is indicated in general by the reference sign 1.

The continuously variable transmission 1 comprises two pulleys 2, 3 which are arranged on separate pulley shafts 4, 5. An endless push belt 6 which is shaped like a closed loop is arranged around the pulleys 2, 3, and serves for transmitting torque between the pulley shafts 4, 5. In a manner known per se, each of the pulleys 2, 3 comprises two pulley sheaves 2a, 2b, 3a, 3b, wherein the push belt 6 is positioned and clamped between said two pulley sheaves 2a, 2b, 3a, 3b, so that with the help of friction, a force may be transmitted between the pulleys 2, 3 and the push belt 6.

FIG. 2 illustrates the fact that the push belt 6 comprises at least one endless carrier 7, which is usually composed of a number of rings having a shape which is more or less oval. Along the entire length of the carrier 7, transverse elements 10 are arranged, wherein the transverse elements 10 are in close contact with each other. For sake of simplicity, only a number of the transverse elements 10 is shown in the diagrammatical depiction provided in FIG. 2. Normally, both the carrier 7 of the push belt 6 and the transverse elements 10 are manufactured from metal.

FIGS. 3 and 4 show a transverse element 10. A first main body surface of the transverse element 10 is indicated in general by the reference sign 11, whereas a second main body surface of the transverse element 10 is indicated in general by the reference sign 12. A circumferential surface 13 extends between the main body surfaces 11, 12.

From bottom to top, the transverse element 10 comprises successively a basic portion 14, a relatively narrow middle portion 15, and a top portion 16 which is generally shaped like the tip of an arrow. Normally, in the push belt 6, the basic portion 14 is located at the side of the inner circumference of the push belt 6, whereas the top portion 16 is located at the side of the outer circumference of the push belt 6. Furthermore, in a push belt 6, at least a portion of the first main body surface 11 of a transverse element 10 abuts against at least a portion of the second main body surface 12 of an adjacent transverse element 10, whereas at least a portion of the second main body surface 12 of the transverse element 10 abuts against at least a portion of the first main body surface 11 of another adjacent transverse element 10. At the transition to the middle portion 15, the basic portion 14 of the transverse element 10 comprises two carrying surfaces 17 which serve for supporting two carriers 7. Furthermore, the basic portion 14 comprises two surfaces 18 which will hereinafter be referred to as pulley sheave contact surfaces 18. When the transverse element 10 moves over the pulley 2, 3, contact between the transverse element 10 and contact surfaces 8 of the pulley sheaves 2a, 2b, 3a, 3b is realized through said pulley sheave contact surfaces 18, as illustrated in FIG. 5.

The transverse element 10 furthermore comprises a bottom surface 19 which extends between the pulley sheave contact surfaces 18. The carrying surfaces 17, the pulley sheave contact surfaces 18, as well as the bottom surface 19 are part of the circumferential surface 13.

In the first main body surface 11 of the transverse element 10, a depression 21 is arranged. In FIG. 4, the depression 21 is depicted by means of dashed lines. In the shown example, the depression 21 is located at the top portion 16, and corresponds to a projection 22 on the second main body surface 12. In the push belt 6, the projection 22 of the transverse element 10 is at least partially located in the depression 21 of a subsequent transverse element 10. The projection 22 and the corresponding depression 21 serve to prevent mutual displacement of adjacent transverse elements 10 in a plane perpendicular to the circumferential direction of the push belt 6.

The top portion 16 comprises two retaining surfaces 23 which are facing the carrying surfaces 17, and which are part of the circumferential surface 13. When the transverse element 10 is arranged in a push belt 6, a position of the carriers 7 in the radial direction is delimited by the carrying surfaces 17 on one side, and by the retaining surfaces 23 on another side.

Figure 6:
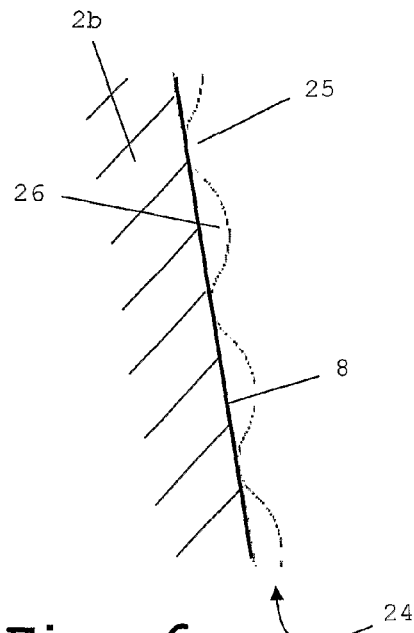
FIG. 6 illustrates a profile which is present on surfaces of a transverse element which is suitable to be used in a push belt according to the present invention, which surfaces serve for contacting sheaves of a pulley.

The present invention is concerned with the design of the pulley sheave contact surfaces 18 of transverse elements 10 in a push belt 6. The pulley sheave contact surfaces 18 are provided with a profile 24. FIG. 6 shows a portion of this profile 24. In the shown example, the profile 24 has a corrugated shape, and comprises a pattern of alternating ribs 25 and grooves 26, which ribs 25 and grooves 26 are extending along the entire width of the pulley sheave contact surface 18, i.e. in a direction on the transverse element 10 which is more or less perpendicular to the main body surfaces 11, 12.

An important function of the profile 24 is improving grip of the push belt 6 on the pulleys 2, 3. Good grip and prevention of slip is needed for realizing effective torque transmittal in the continuously variable transmission 1. Therefore, having the profile 24 directly influences the performance of the continuously variable transmission 1 in a positive way.

It is common use for all transverse elements 10 in a push belt 6 to be equal when it comes to the design of the profile 24 on the pulley sheave contact surfaces 18. Contrariwise, according to the present invention, a push belt 6 has at least two different types of transverse elements 10, wherein the design of the profile 24 is different in each type. Advantageously, the differences are such that when all types of transverse elements 10 are taken into account, the contact surfaces 8 of the pulley sheaves 2a, 2b, 3a, 3b are covered as much as possible, so that these contact surfaces 8 are used in a most effective manner. An associated advantage is the fact that a concentration of wear on only certain areas is avoided.

Figure 7:
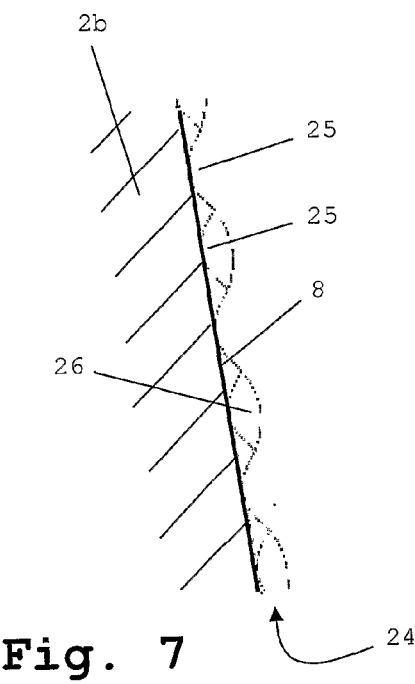
FIG. 7 illustrates a shift of profiles of two adjacent transverse elements of a first embodiment of a push belt according to the present invention.
Figure 8:
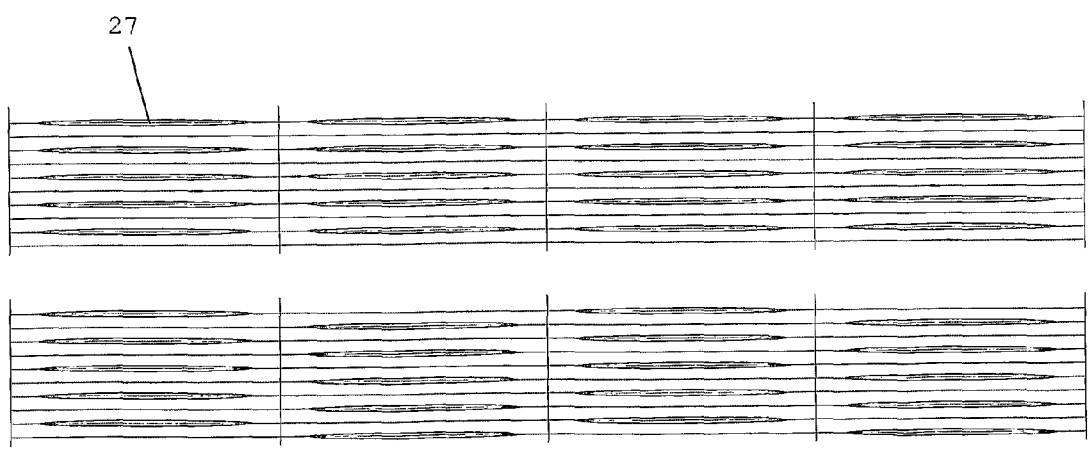
FIG. 8 diagrammatically shows contact areas between transverse elements and a pulley sheave, for both a conventional situation and a situation which may be realized when the present invention is applied.

The present invention can be embodied in numerous ways. A first example is illustrated in FIG. 7. In particular, FIG. 7 provides a view on portions of profiles 24 of two adjacent transverse elements 10 in a push belt 6, and clearly illustrates that the profiles 24 are shifted along the pulley sheave contact surface 18. As a result, the ribs 25 of one of the transverse elements 10 follow a path of the grooves 26 of another of the transverse elements 10, and the grooves 26 of the one of the transverse elements 10 follow a path of the ribs 25 of the other of the transverse elements 10. As a result, the number of areas 27 of the contact surface 8 of a pulley sheave 2a, 2b, 3a, 3b which can be contacted by the ribs 25 of the profile 24 is doubled with respect to a conventional situation with a similar design of the pattern of ribs 25 and grooves 26. This fact is illustrated in FIG. 8, in which areas 27 of contact between four successive transverse elements 10 and a pulley sheave 2a, 2b, 3a, 3b are diagrammatically shown, in respect of both a conventional situation, namely at the top side of FIG. 8, and a situation according to the present invention, namely at the bottom side of FIG. 8. FIG. 8 shows that in the conventional situation, the contact areas 27 are the same for all transverse elements 10, whereas in the situation according to the present invention, this is not the case, and a larger area of the contact surface 8 of the pulley sheave 2a, 2b, 3a, 3b can be covered.

Figure 9:
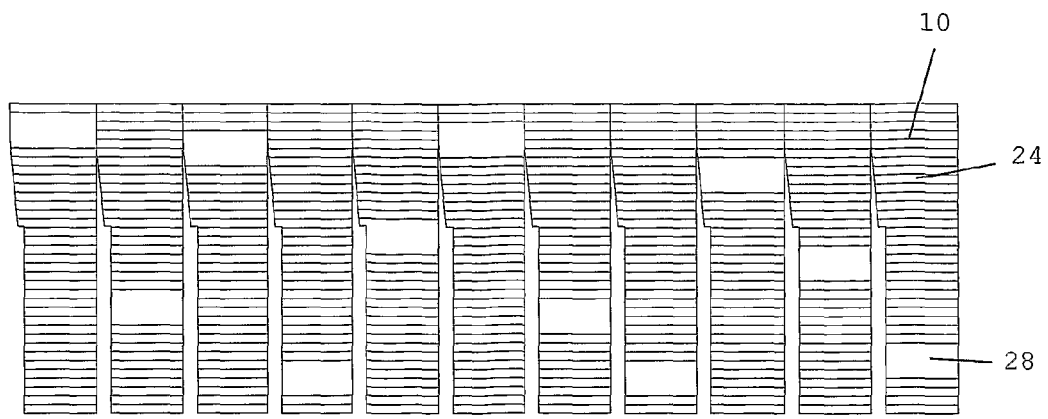
FIG. 9 diagrammatically shows a view of contact surfaces of a number of transverse elements of a second embodiment of a push belt according to the present invention.
Figure 10:
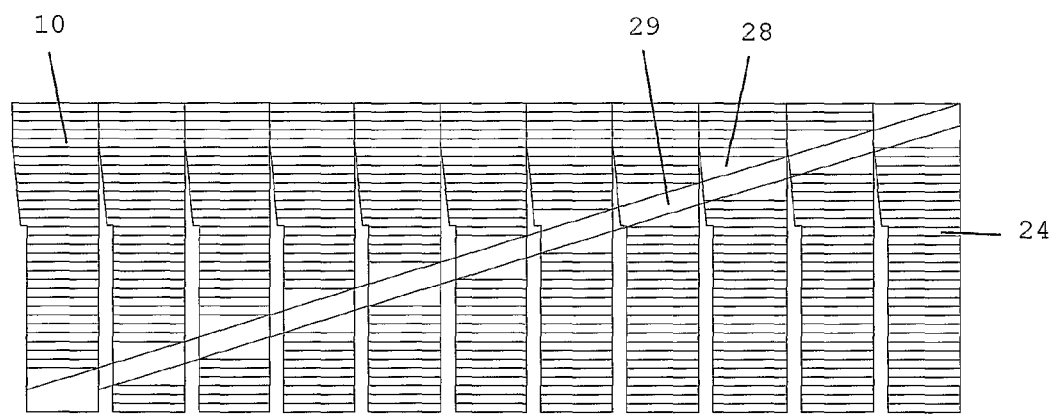
FIG. 10 diagrammatically shows a view of contact surfaces of a number of transverse elements of a third embodiment of a push belt according to the present invention.
Figure 11:
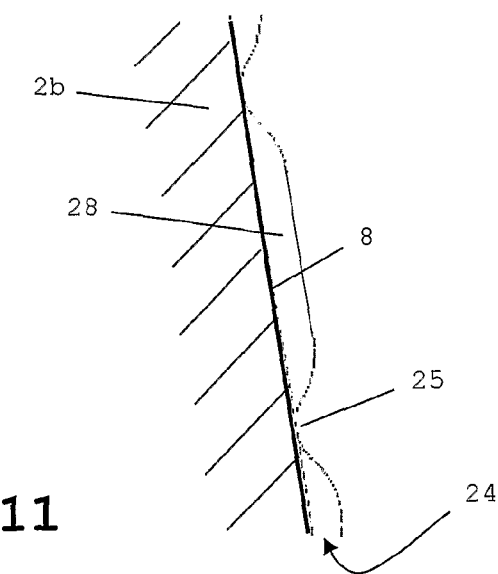
FIG. 11 shows a detail of a profile of the transverse elements shown in FIGS. 9 and 10.

Two other examples of embodiments of the present invention are shown in FIGS. 9 and 10. In both embodiments, in the profile 24 of each of the transverse elements 10, at least one rib 25 is omitted with respect to a regular pattern of ribs 25 and grooves 26. FIG. 11 shows a portion of the profile 24 which is obtained in this way, and clearly illustrates the absence of a rib 25 in an otherwise regular pattern.

In a practical embodiment of a transverse element 10, the number of ribs 25 at one pulley sheave contact surface 18 may be about 35. In the shown examples, a small number of successively positioned ribs 25, like two or three, is omitted. In this way, voids 28 are created in the contact between the pulley sheave contact surface 18 of the transverse element 10 and the pulley sheave 2a, 2b, 3a, 3b. These voids 28 can be used for a discharge of oil from the area where contact takes place. As a result, the grip between the transverse element 10 and the pulley sheave 2a, 2b, 3a, 3b can be enhanced, even though a small portion of the contacting surface 18 of the transverse element 10 is missing. For sake of completeness, it is noted that the oil is present in the continuously variable transmission 1 for lubricating and cooling purposes.

An option of a random arrangement of the transverse elements 10 having the voids 28 in the push belt 6 is illustrated in FIG. 9. In such a push belt 6, when contact is made between transverse elements 10 and a pulley 2, 3, oil is squeezed from an area between the transverse elements 10 and a pulley sheave 2a, 2b, 3a, 3b to the voids 28, as a result of which the extent to which the transverse elements 10 contact the pulley sheave 2a, 2b, 3a, 3b is enhanced.

An option of a defined arrangement of the transverse elements 10 having the voids 28 in the push belt 6 is illustrated in FIG. 10. In the shown example, the voids 28 are arranged such as to form a continuous path 29 along the transverse elements 10, wherein voids 28 partially overlap in a circumferential direction of the push belt 6, and the path 29 is inclined, such as to ensure that the position of a void 28 on the contact surface 8 of a pulley sheave 2a, 2b, 3a, 3b is still random. In this push belt 6, the oil is not only allowed to escape to a void 28 at a local level, but also to be discharged through the path 29 which is formed by the chain of voids 28. By using the path 29, oil can be transported to a suitable accumulation position.

Summarizing, the present invention relates to a push belt 6 for a continuously variable transmission 1, which comprises transverse elements 10 of at least two different types, wherein the differences between the transverse elements 10 reside in a profile 24 which is present at pulley sheave contact surfaces 18 of the transverse elements 10. Advantageously, the differences of the profile 24 are such that areas 27 of contact of the push belt 6 to pulleys 2, 3 of the continuously variable transmission 1 are different for each type of transverse element 10, i.e. have a different positioning on a contact surface 8 of a pulley sheave 2a, 2b, 3a, 3b.

In particular, the profiles 24 on the contact surfaces 18 of the transverse elements 10 comprise a pattern of alternating elevations 25 and recesses 26. Within the scope of the present invention, it is possible for the patterns of elevations 25 and recesses 26 of adjacent transverse elements 10 of a different type to be shifted with respect to each other, in a radial direction in the push belt 6, in at least a part of the total number of transverse elements 10.

On the basis of the use of at least two different types of transverse elements 10 as mentioned, many advantages are achieved, including improved traction as a result of improved friction between the push belt 6 and the pulleys 2, 3, reduction of wear of a contact surface 8 of the pulley sheaves 2a, 2b, 3a, 3b, and noise reduction. The enhanced grip between the push belt 6 and the pulleys 2, 3 is caused by improved distribution and removal of oil that is present between the push belt 6 and the pulleys 2, 3. The design of the profile 24 can be such that a pattern of voids 28 is created at a contact side of the push belt 6, i.e. the side of the push belt 6 where contact to the pulleys 2, 3 is made, which voids 28 are used for receiving oil. The pattern of voids 28 can be random, or not. In the latter case, it is possible to have a path 29 for discharging oil, extending along the contact side of the push belt 6.

It will be clear to a person skilled in the art that the scope of the present invention is not limited to the examples discussed above, but that several amendments and modification thereof are possible without deviating from the scope of the invention as defined in the appended claims.

The invention claimed is:

1. Push belt for a continuously variable transmission, which is particularly destined to be arranged around pulleys of the continuously variable transmission, wherein pulley sheaves are part of the pulleys, the pulley sheaves having contact surfaces, and which push belt comprises a number of transverse elements and ring-shaped carriers for carrying the transverse elements, wherein the transverse elements have carrying surfaces for supporting the carriers, wherein the transverse elements have retaining surfaces facing the carrying surfaces, wherein the position of the carriers is delimited in a radial direction of the push belt by the carrying surfaces at one side, and by the retaining surfaces at another side, and wherein the transverse elements have contact surfaces for engaging the contact surfaces of the pulley sheaves which are part of the pulleys of the continuously variable transmission, wherein the contact surfaces of the transverse elements are provided with a profile, wherein there are at least two types of transverse elements present in the push belt, wherein the profile on the contact surfaces of transverse elements of one type is different than the profile on the contact surfaces of transverse elements of another type, wherein the profiles on the contact surfaces of the transverse elements comprise the same pattern of alternating elevations and recesses, and wherein, in respect of at least a part of the total number of transverse elements, the patterns of elevations and recesses of adjacent transverse elements of a different type are shifted with respect to each other, in the radial direction.

2. The push belt according to claim 1, wherein the elevations are formed as elongated ribs, and wherein the recesses are formed as elongated grooves.

3. Continuously variable transmission comprising a push belt according to claim 1.

4. Push belt for a continuously variable transmission, which is particularly destined to be arranged around pulleys of the continuously variable transmission, wherein pulley sheaves are part of the pulleys, the pulley sheaves having contact surfaces, and which push belt comprises a number of transverse elements and ring-shaped carriers for carrying the transverse elements, wherein the transverse elements have carrying surfaces for supporting the carriers, and wherein the transverse elements have contact surfaces for engaging the contact surfaces of the pulley sheaves which are part of the pulleys of the continuously variable transmission, wherein the contact surfaces of the transverse elements are provided with a profile, wherein there are at least two types of transverse elements present in the push belt, wherein the profile on the contact surfaces of transverse elements of one type is different than the profile on the contact surfaces of transverse elements of another type, wherein the profiles on the contact surfaces of the transverse elements comprise a pattern of alternating elevations and recesses, wherein transverse elements are present in the push belt in which, in the pattern of elevations and recesses of the profiles on the contact surfaces of the transverse elements, at least one elevation is removed with respect to an otherwise regular pattern of elevations and recesses, and wherein a positioning of the missing elevation on the contact surfaces of the transverse elements is different for different types of transverse elements.

5. The push belt according to claim 4, wherein the different types of transverse elements are distributed at random over the push belt.

6. The push belt according to claim 4, wherein, in respect of at least a part of the total number of transverse elements, the positioning of the missing elevation on the contact surfaces of the transverse elements changes in a regular manner in adjacent transverse elements, which means that in each pair of adjacent transverse elements, the same mutual change of position for the missing elevation is present.

7. The push belt according to claim 4, wherein the elevations are formed as elongated ribs, and wherein the recesses are formed as elongated grooves.

8. Continuously variable transmission comprising a push belt according to claim 4.

9. Push belt for a continuously variable transmission comprising:
   a plurality of a first type of transverse element having a carrying surface, a retaining surface facing the carrying surface, and contact surfaces, at least a portion of at least one contact surface having a first profile;
   a plurality of a second type of transverse element having a carrying surface, a retaining surface facing the carrying surface, and contact surfaces, at least a portion of at least one contact surface having a second profile; and
   ring-shaped carriers for carrying the first and second types of transverse elements;
   wherein the position of the carriers is delimited in a radial direction of the push belt by the carrying surfaces at one side, and by the retaining surfaces at another side;
   wherein the profiles comprise one or more patterns of alternating elevations and recesses;
   wherein the first profile is different than the second profile; and
   wherein, in respect of at least a portion of the total number of transverse elements, the patterns of elevations and recesses of adjacent transverse elements of a different type are the same and shifted with respect to each other, in the radial direction.

10. The push belt according to claim 9, wherein each transverse element comprises two contact surfaces, being pulley sheave contact surfaces for engaging contact surfaces of pulley sheaves of pulleys around which the push belt is arranged.

11. The push belt according to claim 9, wherein the different types of transverse elements are distributed at random over the push belt.

12. The push belt according to claim 9, wherein the elevations comprise elongated ribs and the recesses comprise elongated grooves.

13. Push belt for a continuously variable transmission comprising:
   a plurality of a first type of transverse element having a carrying surface and contact surfaces, at least a portion of at least one contact surface having a first profile;
   a plurality of a second type of transverse element having a carrying surface and contact surfaces, at least a portion of at least one contact surface having a second profile; and
   ring-shaped carriers for carrying the first and second types of transverse elements;
   wherein the profiles comprise one or more patterns of alternating elevations and recesses;
   wherein the first profile is different than the second profile;
   wherein transverse elements are present in the push belt in which, in the pattern of elevations and recesses of the profiles on the contact surfaces of the transverse elements, at least one elevation is removed with respect to an otherwise regular pattern of elevations and recesses; and
   wherein a positioning of the missing elevation on the contact surfaces of the transverse elements is different for different types of transverse elements.

14. The push belt according to claim 13, wherein each transverse element comprises two contact surfaces, being pulley sheave contact surfaces for engaging contact surfaces of pulley sheaves of pulleys around which the push belt is arranged.

15. The push belt according to claim 13, wherein the different types of transverse elements are distributed at random over the push belt.

16. The push belt according to claim 13, wherein the elevations comprise elongated ribs and the recesses comprise elongated grooves.

17. Push belt for a continuously variable transmission, which is particularly destined to be arranged around pulleys of the continuously variable transmission, wherein pulley sheaves are part of the pulleys, the pulley sheaves having contact surfaces, and which push belt comprises a number of transverse elements and ring-shaped carriers for carrying the transverse elements, wherein the transverse elements have carrying surfaces for supporting the carriers, wherein the transverse elements have retaining surfaces facing the carrying surfaces, wherein the position of the carriers is delimited in a radial direction of the push belt by the carrying surfaces at one side, and by the retaining surfaces at another side, and wherein the transverse elements have contact surfaces for engaging the contact surfaces of the pulley sheaves which are part of the pulleys of the continuously variable transmission, wherein the contact surfaces of the transverse elements are provided with a profile, wherein there are at least two types of transverse elements present in the push belt, wherein the profile on the contact surfaces of transverse elements of one type is different than the profile on the contact surfaces of transverse elements of another type, wherein the profiles on the contact surfaces of the transverse elements comprise a pattern of alternating elevations and recesses, and wherein, in respect of at least a part of the total number of transverse elements, the patterns of elevations and recesses of adjacent transverse elements of a different type are shifted with respect to each other, in said radial direction, so as for the elevations of one of the transverse elements to follow a path of the recesses of another one of the transverse elements, and the recesses of said one of the transverse elements to follow a path of the elevations of said other one of the transverse elements.

18. The push belt according to claim 17, wherein the elevations are formed as elongated ribs, and wherein the recesses are formed as elongated grooves.

19. Continuously variable transmission comprising the push belt according to claim 17.

* * * * *